(12) United States Patent
Wen et al.

(10) Patent No.: US 9,036,494 B2
(45) Date of Patent: May 19, 2015

(54) METHOD AND DEVICE FOR TRANSMITTING AND RECEIVING POWER HEADROOM REPORT

(75) Inventors: Pingping Wen, Shanghai (CN); Lin Yang, Shanghai (CN); Chongxian Zhong, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 64 days.

(21) Appl. No.: 13/577,786

(22) PCT Filed: Feb. 11, 2010

(86) PCT No.: PCT/CN2010/070673
§ 371 (c)(1),
(2), (4) Date: Aug. 8, 2012

(87) PCT Pub. No.: WO2011/097819
PCT Pub. Date: Aug. 18, 2011

(65) Prior Publication Data
US 2012/0314603 A1    Dec. 13, 2012

(51) Int. Cl.
*H04W 24/10* (2009.01)
*H04W 52/42* (2009.01)
*H04W 52/36* (2009.01)

(52) U.S. Cl.
CPC ............ *H04W 52/42* (2013.01); *H04W 52/365* (2013.01)

(58) Field of Classification Search
CPC ............... H04W 52/0251; H04W 52/0235; H04W 52/221; H04W 52/225; H04W 52/242; H04W 52/243; H04W 52/245; H04W 52/247; H04W 52/246; H04W 52/248; H04W 52/327; H04W 52/365; H04W 52/367

USPC .......................................................... 370/252
See application file for complete search history.

(56) References Cited

U.S. PATENT DOCUMENTS

| 8,483,134 | B2 | 7/2013 | Iwai et al. |
| 2008/0175185 | A1* | 7/2008 | Ji et al. ...................... 370/318 |

(Continued)

FOREIGN PATENT DOCUMENTS

| CN | 101340622 A | 1/2009 |
| CN | 101340711 A | 1/2009 |

(Continued)

OTHER PUBLICATIONS

International Search Report for PCT/CN2010/070673 dated Nov. 18, 2010.

(Continued)

*Primary Examiner* — Omar Ghowrwal
*Assistant Examiner* — Ellen A Kirillova
(74) *Attorney, Agent, or Firm* — Fay Sharpe LLP

(57) ABSTRACT

The present application discloses a method and device for transmitting and receiving a power headroom report, wherein the method for transmitting a power headroom report comprises: forming, at a user equipment, a power headroom report specific to each carrier component; and transmitting the power headroom report to a base station. By implementing the method and device disclosed by the present application, a complete power headroom reporting mechanism can be provided to a LTE-A system having multiple new features. In addition, by receiving the power headroom report specific to each carrier component, the base station can further derive how many resource units need to be allocated to the user equipment, and a corresponding modulation and coding scheme so as to perform an effective resource scheduling and guarantee transmission quality of wireless links.

12 Claims, 6 Drawing Sheets

(56) References Cited

U.S. PATENT DOCUMENTS

| | | | | |
|---|---|---|---|---|
| 2008/0273483 | A1* | 11/2008 | Zhang et al. | 370/318 |
| 2010/0034113 | A1* | 2/2010 | Marinier et al. | 370/252 |
| 2010/0111023 | A1* | 5/2010 | Pelletier et al. | 370/329 |
| 2010/0158147 | A1* | 6/2010 | Zhang et al. | 375/260 |
| 2010/0273515 | A1* | 10/2010 | Fabien et al. | 455/509 |
| 2011/0086666 | A1* | 4/2011 | Okvist et al. | 455/522 |

FOREIGN PATENT DOCUMENTS

| | | |
|---|---|---|
| CN | 101340712 A | 1/2009 |
| CN | 101631333 A | 1/2010 |
| CN | 101715207 A | 5/2010 |
| EP | 2536198 A1 | 12/2012 |
| WO | WO2009/154403 A2 | 12/2009 |
| WO | WO2011/041666 A2 | 4/2011 |

OTHER PUBLICATIONS

3GPP TSG RAN WG1 Meeting #59bis, R1-100045, Uplink Power Control for Carrier Aggregation, Ericsson, ST-Ericsson, Valencia Spain, Jan. 18-22, 2009.

3GPP TS 36.321, V9.1.0, $3^{rd}$ Generation Partnership Project, Technical Specification Group Radio Access Network, Evolved Universal Terrestrial Radio Access (E-UTRA) Medium Access Control (MAC) protocol Specification (Release 9) Dec. 2009.

3GPP TSG RAN WG1 Meeting #58bis, R1-094118, Uplink Power Control for Carrier Aggregation, Research in Motion, UK Limited, Oct. 12-16, 2009, cited in Japanese Office Action.

3GPP TSG RAN WG1 Meeting #59bis, R1-100071, Considerations on uplink power control in LTE-Advanced, CATT, Valencia Spain, Jan. 18-22, 2010, cited in Japanese Office Action.

* cited by examiner

METHOD AND DEVICE FOR TRANSMITTING AND RECEIVING POWER HEADROOM REPORT

FIELD OF THE INVENTION

The present invention generally relates to a wireless communication system, and more particularly relates to a method and device for transmitting and receiving a power headroom report.

BACKGROUND OF THE INVENTION

In the wireless communication system, power control is a key technology. Minimizing the interference in the wireless communication system, on the condition that communication quality is not affected, can be achieved by controlling the transmit power of each User Equipment (UE) and Base Station (BS or eNB), thereby maximizing the system capacity. In addition, the power control further enables the user equipment to have longer standby time.

At present, the power control including opening and closing loops is carried out at the user equipment. Based on such power control, the user equipment needs to transmit a power headroom report to the base station, and based on the received power headroom report, the base station derives a Power Spectral Density (PSD) used by a Physical Uplink Shared Channel (PUSCH) at the user equipment, and the remaining power headroom. Next, with the derived power spectral density and the remaining power headroom, the base station can determine how many Resource Units (RUs) can be allocated to the user equipment and a Modulation and Coding Scheme (MCS) adapted to be used by the user equipment to guarantee obtaining an expected Signal to Interference plus Noise Ratio (SINR) on wireless links between the user equipment and the base station.

In the Third Generation Partnership Project (3GPP) Long Term Evolution (LTE), the aforesaid power headroom is defined as a difference between the allowed maximum transmit power of the user equipment and the current transmit power for PUSCH. In LTE-A, since multiple Carrier Components (CCs) are introduced, new features appear, such as supporting the power control specific to the carrier components, the simultaneous transmission of a Physical Uplink Control Channel (PUCCH) and the PUSCH, and one or more power amplifiers. Thus, the user equipment transmitting power headroom reports to the base station becomes complex compared with LTE-Release 8, and currently, there is no power headroom report considering the new introduced features.

In addition, RAN1 under the Third Generation Partnership Project has agreed to carry out PUCCH and PUSCH power control specific to each carrier component, wherein the PUSCH power control formula for compensating the path loss due to frequency separation is as follows:

$$P_i = \min\{P_{C_iMAX}, 10\log_{10}M_{PUSCH}(i)+P_{O\_PUSCH}(i)+\alpha_i(PL_i-F_{PL}(\Delta f_i))+F_{PL}(\Delta f_i)+\Delta_{TF}(i)+f(\Delta_i)\} \quad (1),$$

where $P_{C_iMAX}$ is the maximum transmit power of a user equipment on the $i$th carrier component;

$M_{PUSCH}(i)$ is the number of resource units allocated to the $i$th carrier component;

$P_{0\_PUSCH}(i)$ and $\alpha_i$ are open loop power control parameters specific to the $i$th carrier component;

$PL_i$ is the estimated path loss for the $i$th carrier component;

$F_{PL}(\Delta f_i)$ is the path loss difference due to the frequency separation $\Delta f_i$ for the $i$th carrier component relative to the anchor carrier component;

$\Delta_{TF}(i)$ is the offset with respect to the transport format;

$f(\Delta_i)$ is the function of the closed loop power control command.

The full compensation for the PUCCH can be calculated via the following formula:

$$P_{PUCCH}(i)=P_{0\_PUCCH}(i)+PL(i)+h(\cdot)+\Delta_{F\_PUCCH}(\cdot)+g(i) \quad (2)$$

where $P_{0\_PUCCH}(i)$ is the sum of the cell specific parameter and the user equipment specific parameter specific to the $i$th carrier component;

$PL(i)$ is the estimated path loss for the $i$th carrier component;

$h(\cdot)$ is the PUCCH format related parameter;

$\Delta_{F\_PUCCH}(\cdot)$ is the parameter corresponding to the PUCCH format 1a;

$g(i)$ is the function of the closed loop power control command on the $i$th carrier component.

In RAN1#55bis, in addition to the Time Division Multiplexing (TDM) between PUSCH and PUCCH that is currently done in LTE Release8, LTE Release10 also supports simultaneous transmission of PUCCH and PUSCH on the same carrier component. Thus, the transmit power of the user equipment needs to be shared between the two channels so that the total transmit power on the $i$th carrier component equals to the sum of the transmit power of two channels, i.e. PUSCH and PUCCH, as expressed by the formula below:

$$P_i^{sum}=P_i^{PUSCH}+P_i^{PUCCH} \quad (3)$$

where $P_i^{sum}$ is the total transmit power of the user equipment on the $i$th carrier component; $P_i^{PUSCH}$ is the transmit power of the PUSCH on the $i$th carrier component; and $P_i^{PUCCH}$ is the transmit power of the PUCCH on the $i$th carrier component.

Based on the above formula (3), many existing technical solutions related to the power headroom report submit that since the base station knows the standardized rule used to allocate power between PUSCH and PUCCH, they propose to transmit to the base station the power headroom report calculated via the formula below:

$$P_i^H=P_{i,CMAX}-P_i^{PUSCH}-P_i^{PUCCH} \quad (4)$$

where $P_i^H$ is the power headroom on the $i$th carrier component; and $P_{i,CMAX}$ is the maximum allowed transmit power on the $i$th carrier component. However, the power spectral density derived at the user equipment is not only based on the open loop power control but also based on the closed loop power control command function, and the closed loop power control command transmitted by the base station may be incorrect (e.g. when decoding the closed loop power control command at the user equipment, an error occurs or the closed loop power control command signal cannot be detected correctly). Thus, in the existing technical solutions, since the base station only receives the power headroom report including the final power headroom value and does not receive the power value used by the PUSCH and PUCCH on the $i$th carrier component, it is impossible for the base station to derive the power spectral density used by the PUSCH at the user equipment, and the remaining power headroom, and further it is impossible to accurately determine how many resource units need to be allocated to the carrier component, and thereby it is impossible to achieve accurate resource scheduling and allocating.

Thus, methods and devices for transmitting and receiving a power headroom report are needed to provide a complete power headroom reporting mechanism for the multiple new features (e.g. multiple carrier components, the simultaneous transmission of PUCCH and PUSCH on one carrier component, and one or more power amplifiers) introduced in LTE-A. Based on the power headroom reporting mechanism, the base station may effectively carry out resource allocating and scheduling to achieve the expected transmission quality.

SUMMARY OF THE INVENTION

In view of the above problem existing in the prior art, the present invention provides a new solution as below:

According to one aspect of the present invention, there is provided a method for transmitting a power headroom report, comprising: forming, at a user equipment, a power headroom report specific to each carrier component; and transmitting the power headroom report to a base station.

Preferably, the power headroom report is included in a packet data unit of a physical uplink shared channel transmitted on a carrier component.

Preferably, transmitting the power headroom report to the base station is triggered based on a period or an event specific to each carrier component.

Further preferably, the period is a plurality of transmission time intervals or a certain timer value.

Further preferably, the event is that since the previous power headroom report is transmitted, the change of the transmission path loss between the user equipment and the base station has exceeded a certain predetermined value or the user equipment has carried out a predetermined number of power control commands.

Preferably, the power headroom report includes content items related to a physical uplink shared channel transmit power and a physical uplink control channel transmit power.

According to another aspect of the present invention, there is provided a method for receiving a power headroom report, comprising: receiving, at a base station, a power headroom report specific to each carrier component from a user equipment; and based on the received power headroom report, determining a power spectral density and remaining power headroom of a physical uplink shared channel on each carrier component.

Preferably, the method further comprises: based on the power spectral density and the remaining power headroom of the physical uplink shared channel, determining the number of resource units to be allocated to each carrier component and a modulation and coding scheme.

According to one aspect of the present invention, there is provided a device for transmitting a power headroom report, comprising: a forming module for forming, at a user equipment, a power headroom report specific to each carrier component; and a transmitting module for transmitting the power headroom report to a base station.

According to another aspect of the present invention, there is provided a device for receiving a power headroom report, comprising: a receiving module for receiving, at a base station, a power headroom report specific to each carrier component from a user equipment; a determining module for determining, based on the received power headroom report, a power spectral density and remaining power headroom of a physical uplink shared channel on each carrier component.

By implementing the method and device as provided by the present invention, a complete power headroom reporting mechanism can be provided to the LTE-A system having multiple new features (e.g. multiple carrier components, the simultaneous transmission of PUCCH and PUSCH on one carrier component, and one or more power amplifiers). Further, by receiving the power headroom report specific to each carrier component, a base station can correctly derive how many resource units need to be allocated to a user equipment, and a corresponding modulation and coding scheme so as to perform effective resource scheduling and guarantee transmission quality of wireless links.

BRIEF DESCRIPTION OF THE DRAWINGS

Other features, objects and advantages of the present invention will become more obvious by making references to the following detailed description of nonrestrictive embodiments in conjunction with the accompanying drawings. In the accompanying drawings, the same and similar reference signs represent same or similar devices or method steps, in which.

DETAILED DESCRIPTION OF EMBODIMENTS

Embodiments of the present invention will be described below in detail by making references to the accompanying drawings.

Figure 1:
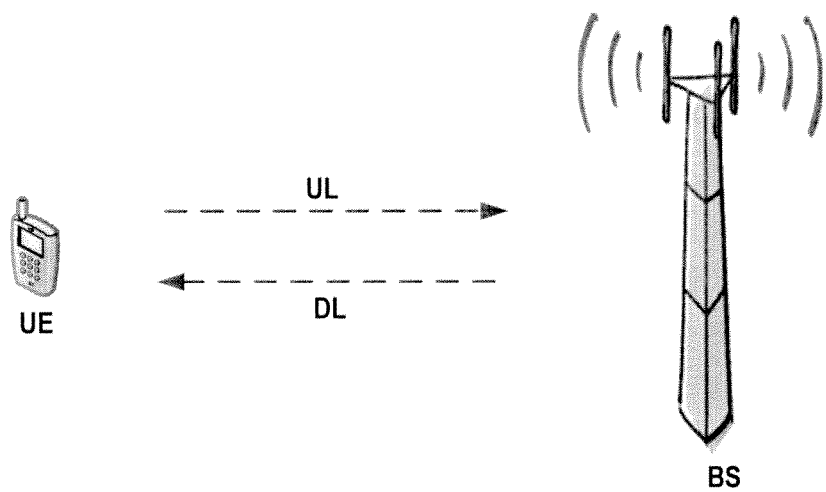
FIG. 1 is a schematic diagram illustrating a wireless communication system to which a method according to the present invention may be applied.

Reference is first made to FIG. 1, where a wireless communication system to which a method according to the present invention may be applied is illustrated. The wireless communication system, for example, may be a 3GPP LTE-A system. As illustrated in FIG. 1, a base station and a user equipment carry out wireless communication according to a method of the present invention, including: a user equipment transmitting a power headroom report (specific to each carrier component, and will be described below in detail) to a base station in an uplink (UL) direction, while the base station that provides a wireless access service, after receiving the power headroom report transmitted by the user equipment, determining a power spectral density and remaining power of the user equipment based on the received power headroom report to thereby determine the number of resource units to be allocated to the user equipment and a corresponding modulation and coding scheme so as to guarantee the expected signal to interference plus noise ratio of the wireless links between the base station and the user equipment. Next, the base station transmits, at a downlink (DL) direction, the determined number of resource units and corresponding modulation and coding scheme to the user equipment. It needs to be pointed out that the illustrated wireless communication system is only illustrative and its purpose is for explaining the principle of the present invention. Furthermore, to avoid unnecessarily obscuring the principle of the present invention, the network elements, components and corresponding wireless communication processing procedures that are irrelevant to the method of the present invention but essential to wireless communication are omitted.

Figure 2:
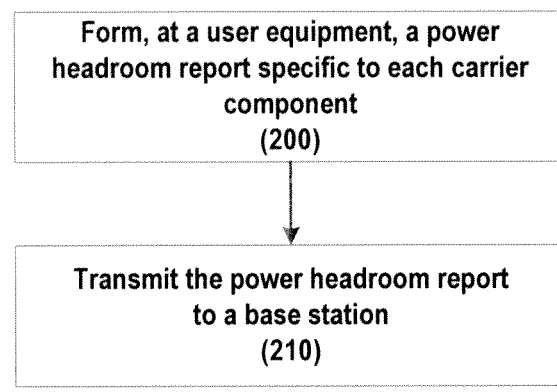
FIG. 2 is a simplified flowchart exemplarily illustrating a method for transmitting a power headroom report according to an embodiment of the present invention.

FIG. 2 is a simplified flowchart exemplarily illustrating a method for transmitting a power headroom report according to the present invention. At step 200, a power headroom report specific to each carrier component is formed at a user equipment. In the present invention, forming the power headroom report specific to each carrier component lies in considering based on the aforesaid open loop formula and closed loop power control command function specific to each carrier component, forming, on each carrier component, a power spectral density specific to the carrier component. To enable a base station to determine the number of resource units allocated to the PUSCH on each carrier component of a served user equipment, the power headroom report about each carrier component should be transmitted to the base station.

Preferably, the power headroom report specific to each carrier component is included in a Packet Data Unit (PDU) transmitted over the PUSCH on the carrier component.

When a user equipment simultaneously transmits PUCCH and PUSCH on the $i$th carrier component, the power headroom report specific to the $i$th carrier component formed at the user equipment may relate to the maximum transmit power allowed by the $i$th carrier component, and the current PUSCH and PUCCH transmit power on the $i$th carrier component. For example, for the $i$th carrier component, $P_{i,CMAX}=24$ dBm=251 mw, $P_i^{PUCCH}=19$ dBm=80 mw, $P_i^{PUSCH}=20.8$ dbm=120 mw, then the content items of the power headroom report specific to the $i$th carrier component formed at the user equipment can be expressed as below:

$P_{i,CMAX}-P_i^{PUSCH}=21.1$ dBm and $P_{i,CMAX}-P_i^{PUCCH}=22.3$ dBm;

$P_{i,CMAX}-P_i^{PUSCH}=21.1$ dBm and $P_{i,CMAX}-P_i^{PUSCH}-P_i^{PUCCH}=17$ dBm;

$P_{i,CMAX}-P_i^{PUCCH}=22.3$ dBm and $P_{i,CMAX}-P_i^{PUSCH}-P_i^{PUCCH}=17$ dBm;

$P_{i,CMAX}-P_i^{PUSCH}=21.1$ dBm and $P_i^{PUCCH}=19$ dBm=80 mw;

$P_{i,CMAX}-P_i^{PUCCH}=22.3$ dBm and $P_i^{PUSCH}=20.8$ dbm=120 mw;

$P_i^{PUCCH}=19$ dBm=80 mw and $P_{i,CMAX}-P_i^{PUSCH}-P_i^{PUCCH}=17$ dBm;

$P_i^{PUSCH}=20.8$ dbm=120 mw and $P_{i,CMAX}-P_i^{PUSCH}-P_i^{PUCCH}=17$ dBm.

From the above exemplary content items, it can be seen that the present invention does not transmit only one content item as Formula (4) like the existing technical solutions, but respectively transmits the transmit power situations about PUSCH and PUCCH in two items in the power headroom report specific to the $i$th carrier component, that is, the power headroom report provided by the present invention includes the contents items related to the PUSCH transmit power and the PUCCH transmit power to thereby overcome the defects existing in the existing technical solutions, while the base station can perform correct resource allocating or scheduling based on the power headroom report.

In addition, it needs to be pointed out that although the user equipment may only transmit PUSCH on the $i$th carrier component at present, the power headroom report specific to the $i$th carrier component formed at the user equipment may also relate to the aforesaid maximum transmit power allowed by the $i$th carrier component, and the current PUSCH transmit power and the potential PUCCH transmit power on the $i$th carrier component. Thus, when a power headroom report similar to the above when PUSCH and PUCCH exist simultaneously is transmitted to a base station, the base station can perform correct resource allocating or scheduling for use in the future when transmitting data on PUSCH and PUCCH.

Now returning to the flowchart of FIG. 2, at step 210, a power headroom report is transmitted to a base station.

Preferably, transmitting the power headroom report to the base station may be triggered based on a period or an event specific to each carrier component. Here, the period may be a plurality of transmission time intervals or a timer value in a unit of millisecond for example, while the event, for example, may be that since the previous power headroom report is transmitted, the change of the transmission path loss between the user equipment and the base station has exceeded a certain predetermined value or the user equipment has carried out a predetermined number of power control commands.

Figure 3:
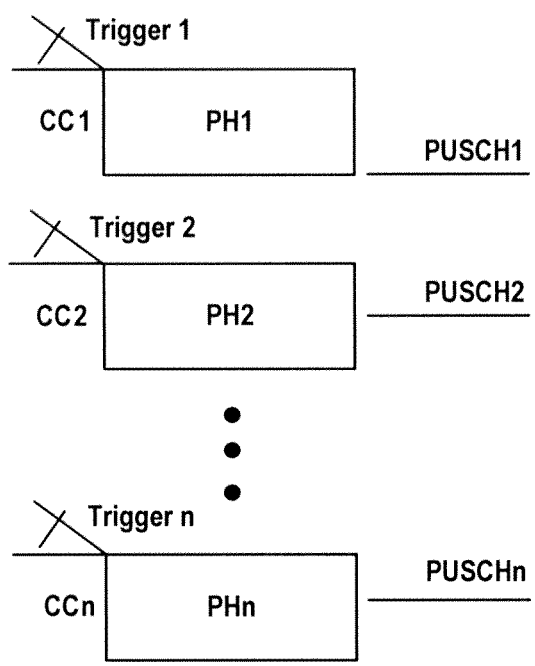
FIG. 3 is a schematic diagram illustrating transmission of the power headroom report according to an embodiment of the present invention.

FIG. 3 is a schematic diagram exemplarily illustrating the transmission of power headroom report according to embodiments of the present invention. As illustrated in FIG. 3, the user equipment is allocated with a plurality of carrier components, e.g. CC1, CC2 . . . CCn, wherein each carrier component has a trigger (periodic or event) specific to itself, e.g. trigger 1, trigger 2 . . . trigger n, while a specific power headroom report is formed for each carrier component, e.g. PH1, PH2 . . . PHn shown in FIG. 3, and each power headroom report PH1, PH2 . . . PHn includes various content items mentioned above. On the corresponding PUSCH, the power headroom reports included in the packet data unit are transmitted to the base station. For example, PH1 is transmitted on PUSCH1; PH2 is transmitted on PUSCH2; . . . while PHn is transmitted on PUSCHn.

Figure 4:
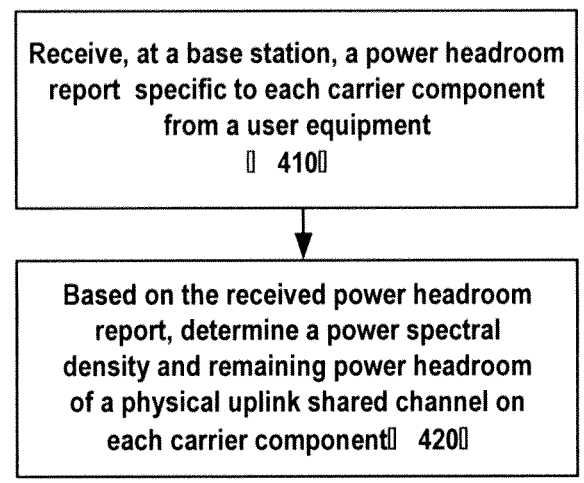
FIG. 4 is a simplified flowchart exemplarily illustrating a method for receiving a power headroom report according to an embodiment of the present invention.

FIG. 4 is a flowchart exemplarily illustrating a method for receiving a power headroom report according to an embodiment of the present invention. Where, at step 410, a power headroom report specific to each carrier component is received at a base station from a user equipment. Next, at step 420, the power spectral density and the remaining power headroom of the physical uplink shared channel on each carrier component are determined based on the received power headroom report. The determination process will be described below in detail:

After receiving the aforesaid power headroom report related to the maximum transmit power allowed by the $i$th carrier component and the current PUSCH and PUCCH transmit power (or potential PUCCH transmit power) on the $i$th carrier component, the base station can determine $P_i^{PUCCH}=19$ dBm=80 mw and $P_i^{PUSCH}=20.8$ dbm=120 mw, and determine that the remaining power headroom is $P_{i,CMAX}-P_i^{PUSCH}-P_i^{PUCCH}=17$ dBm. Next, the power spectral density on PUSCH at the user equipment can be obtained by calculation below:

$$PSD_i=P_i^{PUSCH}-10\log_{10}M_{PUSCH}(i)=20.8 \text{ dBm}-10\log 104=14.8 \text{ dBm} \qquad (5)$$

In the above formula, the number of resource units M is assumed as 4. Further, the base station can determine the number of resource units M' of the $i$th carrier component to be allocated to the user equipment, based on the formula below:

$$10*\log 10(M')=P_{i,CMAX}-PSD_i \qquad (6)$$

In addition, the base station can further determine an appropriate modulation and coding scheme based on the power headroom report transmitted by the user equipment. Specifically, the base station obtains the signal to interference plus noise ratio of PUSCH based on the derived power spectral density $PSD_i$ and the measured channel quality to thereby determine a modulation and coding scheme to be used by the user equipment and corresponding to the signal to interference plus noise ratio.

It needs to be pointed out that the above formula calculation and numerical value are merely exemplary, and their purpose is for explaining the principle of the present invention. To avoid unnecessarily obscuring the principle of the present invention and to simplify the description, the concepts, formulas, calculation process or steps that are well known to those skilled in the art are omitted herein.

Figure 5:
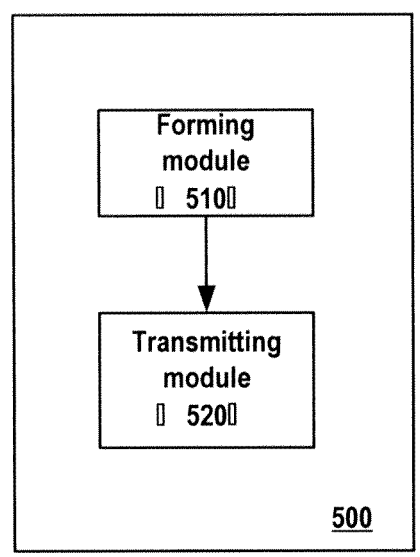
FIG. 5 is a simplified block diagram exemplarily illustrating a device for transmitting a power headroom report according to an embodiment of the present invention.

FIG. 5 is a simplified block diagram illustrating a device 500 for transmitting a power headroom report according to an embodiment of the present invention. As illustrated in FIG. 5, the device 500 comprises a forming module 510 and a transmitting module 520, wherein the forming module 510 is for forming, at a user equipment, a power headroom report specific to each carrier component, and the detailed forming process may refer to the above description with reference to FIG. 2; while the transmitting module 520 is for transmitting the power headroom report to a base station.

Figure 6:
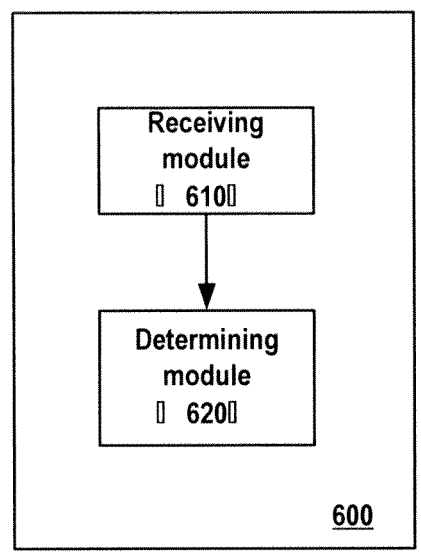
FIG. 6 is a simplified block diagram exemplarily illustrating a device for receiving a power headroom report according to an embodiment of the present invention.

FIG. 6 is a simplified block diagram exemplarily illustrating a device 600 for receiving a power headroom report according to an embodiment of the present invention. As illustrated in FIG. 6, the device 600 comprises a receiving module 610 and a determining module 620, wherein the receiving module 610 is for receiving, at a base station, a power headroom report specific to each carrier component from a user equipment, while the determining module 620 is for determining, based on the received power headroom report, a power spectral density and remaining power headroom of a physical uplink shared channel on each carrier component, and the detailed determining process may refer to the above description with reference to FIG. 4.

Although the LTE-A wireless communication system is taken as an example here to describe the present invention, the present invention can be applied to in any wireless communication systems that perform power control at the user equipment side and have multiple carrier components. In addition, according to the present invention, for the situation that one or more power amplifier exist in LTE-A, a power headroom report specific to a carrier component relates to a difference between the maximum transmit power specific to the carrier component and the power used on the carrier component, while the maximum transmit power specific to the carrier component is not associated with the total transmit power of the user equipment, and thus when the base station performs resource scheduling, it only needs to be noted that the sum of the maximum transmit powers on all carrier components should not exceed the total transmit power of the user equipment. That is to say, forming a power headroom reporting mechanism specific to a carrier component in the present invention is not affected by one or more power amplifiers.

Embodiments of the present invention are described above with reference to the accompanying drawings. It should be noted that to facilitate the understanding of the present invention, some more specific technical details that are well-known to those skilled in the art and may be necessary for implementing the present invention are omitted in the above descriptions.

The present invention may employ a form of complete hardware embodiments, complete software embodiments, or both. In a preferred embodiment, the present invention is implemented as software, including, without limitation to, firmware, resident software, micro-code, etc.

The specification of the present invention is provided for explanation and description purposes, rather than exhausting or limiting the present invention as the disclosed form. Many modifications and changes would be apparent to those of ordinary skill in the art, Therefore, selecting and describing the embodiments is to better explain the principle and the actual application of the present invention, and to enable those of ordinary skill in the art to understand that, without departure from the essence of the present invention, all modifications and changes fall into the protection scope of the present invention defined by the claims.

What is claimed is:

1. A method for transmitting a power headroom report, comprising:
forming, at a user equipment, a power headroom report specific to each carrier component; and
transmitting the power headroom report to a base station, wherein the power headroom report is included in a packet data unit of a physical uplink shared channel transmitted on the carrier component;
wherein the power headroom report comprises content items related to a physical uplink shared channel transmit power and a physical uplink control channel transmit power, and wherein the content items include $P_{i,CMAX} - P_i^{PUSCH}$ and $P_{i,CMAX} - P_i^{PUSCH} - P_i^{PUCCH}$, where $P_{i,CMAX}$ denotes maximum transmit power allowed by the $i$'th carrier component, $P_i^{PUSCH}$ denotes current physical uplink shared channel transmit power on the $i$'th carrier component and $P_i^{PUCCH}$ denotes current physical uplink control channel transmit power on the $i$'th carrier component.

2. The method according to claim 1, wherein transmitting the power headroom report to the base station is triggered based on a period or an event specific to each carrier component wherein the period is a plurality of transmission time intervals or a certain timer value, and wherein the event is that since the previous power headroom report is transmitted, the change of the transmission path loss between the user equipment and the base station has exceeded a certain predetermined value or the user equipment has carried out a predetermined number of power control commands.

3. A method for receiving a power headroom report, comprising:
receiving, at a base station, a plurality of power headroom reports each specific to a corresponding carrier component from a user equipment, wherein the individual power headroom report are each included in a packet data unit of a physical uplink shared channel transmitted on the carrier component; and
based on the each individual received power headroom report, determining a power spectral density and remaining power headroom of a physical uplink shared channel on the corresponding carrier component;
wherein the power headroom report comprises content items related to a physical uplink shared channel transmit power and a physical uplink control channel transmit power, and wherein the content items include $P_{i,CMAX} - P_i^{PUSCH}$ and $P_{i,CMAX} - P_i^{PUSCH} - P_i^{PUCCH}$, where $P_{i,CMAX}$ denotes maximum transmit power allowed by the $i$'th carrier component, $P_i^{PUSCH}$ denotes current physical uplink shared channel transmit power on the $i$'th carrier component and $P_i^{PUCCH}$ denotes current physical uplink control channel transmit power on the $i$'th carrier component.

4. The method according to claim 3, wherein the method further comprises:
based on the power spectral density and the remaining power headroom of the physical uplink shared channel, determining the number of resource units to be allocated to the each carrier component and a modulation and coding scheme.

5. A device for transmitting a power headroom report, comprising:
a forming module for forming, at a user equipment, a power headroom report specific to each carrier component; and
a transmitting module for transmitting the power headroom report to a base station, wherein the power headroom report is included in a packet data unit of a physical uplink shared channel transmitted on the carrier component;
wherein the power headroom report comprises content items related to a physical uplink shared channel transmit power and a physical uplink control channel transmit power, and wherein the content items include $P_{i,CMAX} - P_i^{PUSCH}$ and $P_{i,CMAX} - P_i^{PUSCH} - P_i^{PUCCH}$, where $P_{i,CMAX}$ denotes maximum transmit power allowed by the $i$th carrier component, $P_i^{PUSCH}$ denotes current physical uplink shared channel transmit power on the $i$th carrier component and $P_i^{PUCCH}$ denotes current physical uplink control channel transmit power on the $i$th carrier component.

6. The device according to claim 5, wherein the transmitting module transmits the power headroom report to the base station based on a period or an event specific to each carrier component, wherein the period is a plurality of transmission time intervals or a certain timer value, and wherein the event is that since the previous power headroom report is transmitted, the change of the transmission path loss between the user equipment and the base station has exceeded a certain predetermined value or the user equipment has carried out a predetermined number of power control commands.

7. A device for receiving a power headroom report, comprising:
a receiving module for receiving, at a base station, a plurality of power headroom reports each specific to a corresponding carrier component from a user equipment, wherein the individual power headroom report are each included in a packet data unit of a physical uplink shared channel transmitted on the carrier component;
a determining module for determining, based on the each individual received power headroom reports, a power spectral density and remaining power headroom of a physical uplink shared channel on the corresponding carrier component;
wherein the power headroom report comprises content items related to a physical uplink shared channel transmit power and a physical uplink control channel transmit power, and wherein the content items include $P_{i,CMAX} - P_i^{PUSCH}$ and $P_{i,CMAX} - P_i^{PUSCH} - P_i^{PUCCH}$, where $P_{i,CMAX}$ denotes maximum transmit power allowed by the $i$th carrier component, $P_i^{PUSCH}$ denotes current physical uplink shared channel transmit power on the $i$th carrier component and $P_i^{PUCCH}$ denotes current physical uplink control channel transmit power on the $i$th carrier component.

8. The device according to claim 7, wherein the determining module further determines, based on the power spectral density and the remaining power headroom of the physical uplink shared channel, the number of resource units to be allocated to the each carrier component and a modulation and coding scheme.

9. The method of claim 1, wherein the power headroom report formed at the user equipment is based solely on the information from one carrier component.

10. The device of claim 5, wherein the power headroom report formed at the user equipment is based solely on the information from one carrier component.

11. The method of claim 3, wherein the plurality of power headroom reports received at the base station are based solely on the information from one carrier component.

12. The device of claim 7, wherein the plurality power headroom reports received at the base station are based solely on the information from one carrier component.

* * * * *